Nov. 14, 1961

W. H. MORRIS ET AL 3,008,774

BALL WAY CONSTRUCTION

Filed March 23, 1959

INVENTORS
WALTER H. MORRIS & PAUL ANDERSON
BY
Barnes, Kisselle, Raisch
& Choate
ATTORNEYS Nov. 14, 1961  W. H. MORRIS ET AL  3,008,774
BALL WAY CONSTRUCTION
Filed March 23, 1959  2 Sheets-Sheet 2

INVENTORS
WALTER H. MORRIS & PAUL ANDERSON
BY
ATTORNEYS

United States Patent Office 3,008,774
Patented Nov. 14, 1961

3,008,774
BALL WAY CONSTRUCTION
Walter H. Morris and Paul Anderson, Rochester, Mich., assignors to Beaver Precision Products, Inc., Clawson, Mich., a corporation of Michigan
Filed Mar. 23, 1959, Ser. No. 801,196
9 Claims. (Cl. 308—3)

This invention relates to a ball way construction and more particularly to a means for preloading the balls in such construction.

In many machine tools used for high precision work, there is positive need for high accuracy positioning of the machine tool table, slide, head, etc. It is common in such machine tools to form the base supporting member with a pair of parallel ways of high accuracy and moving the table, slide or head along these ways by a bearing arrangement of some sort.

The present invention has for its object the provision of a novel bearing arrangement for such ways which incorporates a plurality of bearing balls and also a novel means for preloading the bearing balls so that extreme ease of motion is obtained in one plane and optimum stiffness between the supporting base and the table, slide or head is obtained in the other two planes.

A further object of the invention resides in the provision of a bearing unit in the form of a compact cartridge containing two endless series of bearing balls, the cartridge being designed for economical manufacture and such that it is readily mountable on a machine tool component for smoothly and accurately guiding the component along ways on the machine tool.

The ball way of the present invention is also characterized by the simplicity in its construction and the elimination of the need for gibs, keepers and side rail guides which are considered necessary in conventional constructions.

Figure 5:
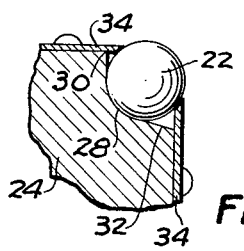
FIG. 5 is a fragmentary end view on an enlarged scale of one of the ball way cartridges or bearing units with the end plate and deflector removed.
Figure 3:
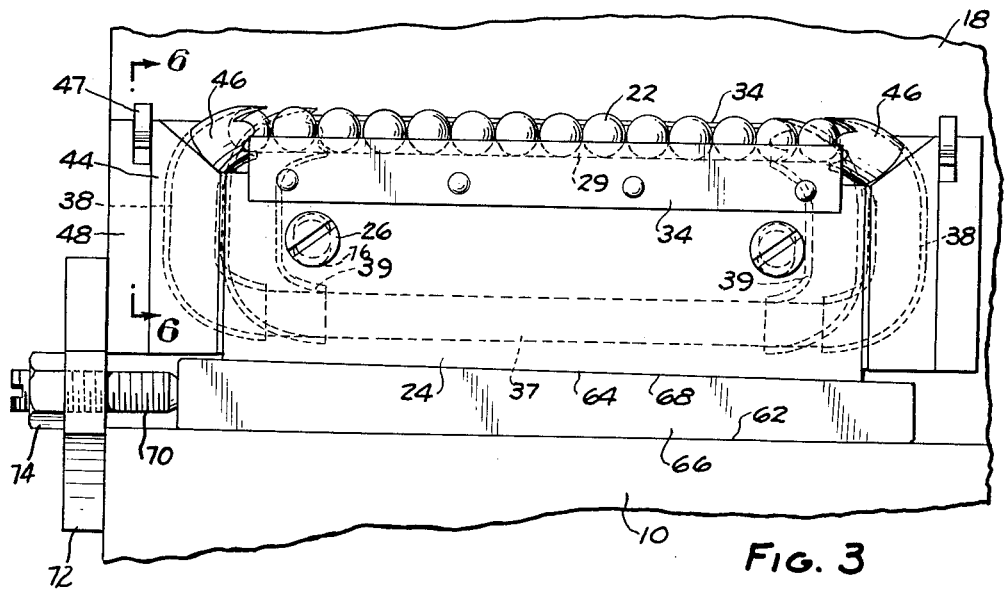
FIG. 3 is a fragmentary bottom plan view on an enlarged scale of one corner portion of the table illustrated in FIG. 2.

In the drawings, the base of a machine tool is indicated at 10. Base 10 is provided with milled slots 12 in which are fitted machined ways 14. Screws 16 are provided for securing the ways 14 in the milled slots 12. The table 18 of the machine tool is supported by ways 14 for movement in a rectilinear path. The means provided for supporting table 18 in ways 14 comprise a series of four bearing units or cartridges 20 employing balls 22 as the anti-friction elements. Each bearing unit or cartridge 20 is in the form of a support block 24 of generally rectangular shape which is secured to the underside of table 18 by bolts 26. Support blocks 24 are formed with arcuately shaped ball grooves 28, 29 at the outer and lower corners thereof. The ball grooves 28, 29, it will be noted, have an arcuate inner portion provided with a radius corresponding to the radius of the balls 22 and the opposite edge portions of the grooves are flattened as indicated at 30 and 32 (FIG. 5). Thus, the arcuate portions of grooves 28, 29 extend circumferentially around an insufficient portion of the balls 22 to retain the balls 22 in the grooves 28. Balls 22 are retained in the grooves 28, 29 by plate members 34 which are mounted on the faces of support blocks 24 adjacent the grooves 28, 29. Plates 34 overlap the edges 30, 32 of grooves 28, 29 and project into the grooves a sufficient amount to trap the balls 22 radially in the grooves.

Figure 4:
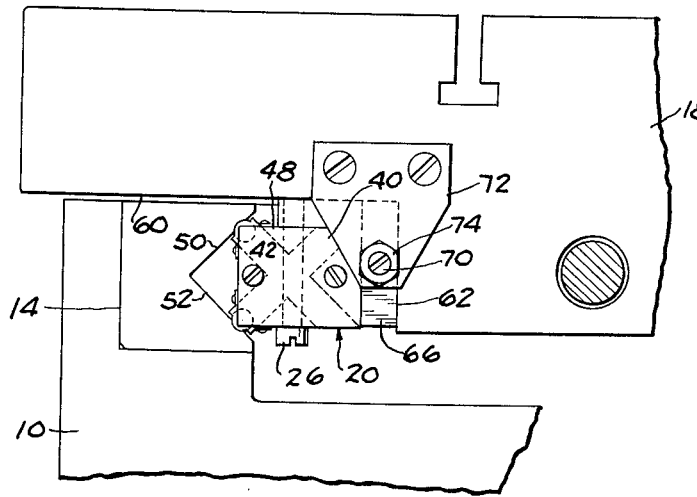
FIG. 4 is a fragmentary end view of a portion of the machine tool illustrated in FIG. 1.
Figure 6:
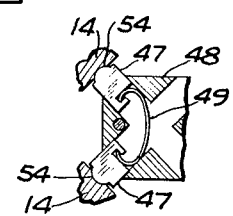
FIG. 6 is a sectional view along the line 6—6 in FIG. 3.

Each support block 24 is also provided with two internal longitudinally extending ball return passageways 36, 37. The means for circulating the balls between groove 28 and passageway 37 and between groove 29 and passageway 36 are in the form of return tubes 38, 39 at the opposite ends of each support block 24. Return tubes 38, 39 are arcuately shaped as illustrated, the tubes 39 being seated in diagonal slots 40 in the opposite ends of support block 24 and the tubes 38 being seated in diagonal slots 42 formed on the inner faces of end cap plates 44 secured to the opposite ends of support block 24 (FIG. 4). The upper ends of return tubes 38 register with the opposite ends of the upper return passageway 36. The lower ends of return tubes 39 register with the opposite ends of lower return passageway 37. The upper ends of return tubes 39 and the lower ends of return tubes 38 are formed as deflectors 46 which guide the balls 22 into grooves 28 and 29, respectively, so that the balls roll smoothly around the ball grooves, return tubes and return passageways.

Ways 14 are generally V-shaped in cross section and thus provided with a pair of oppositely inclined faces 50, 52. These faces 50, 52 are formed with shallow arcuate grooves 54 in which the balls 22 roll. Brass wipers 47 resiliently seated in slotted end plates 48 by spring 49 are arraanged to maintain the arcuate grooves 54 in ways 14 free of dirt and other foreign material.

Figure 1:
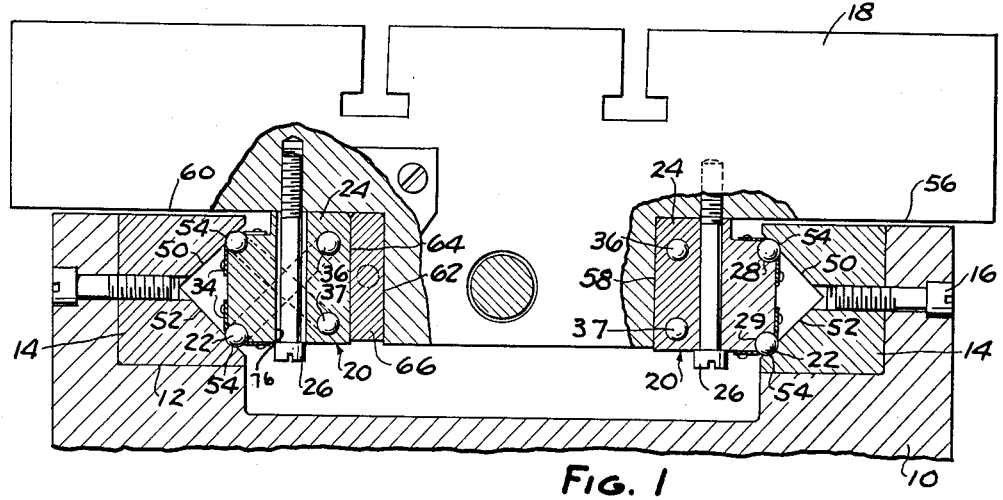
FIG. 1 is a fragmentary end elevational view, partly in section, of a machine tool having a table mounted for movement in ways on the base of the machine tool in accordance with the present invention.
Figure 2:
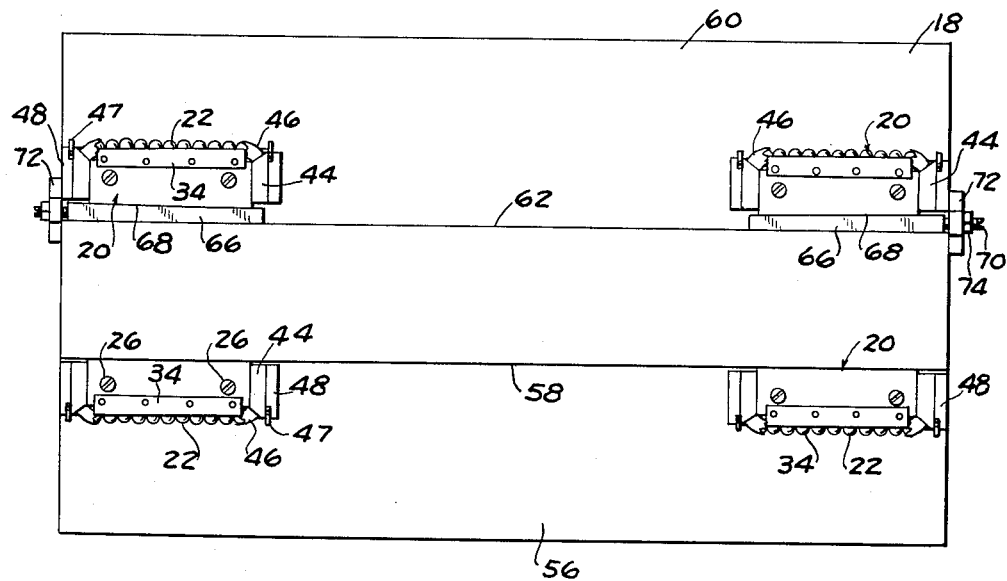
FIG. 2 is a bottom plan view on a reduced scale of the table shown in FIG. 1.

The two cartridges 20 on one side of table 18, the cartridges at the right of FIG. 1 and at the lower side of FIG. 2, are fixedly mounted against the milled faces 56, 58 on the underside of table 18. The other side of table 18 on its undersurface is likewise provided with a pair of perpendicularly related milled faces 60, 62. The top face of the other two cartridges are seated solidly against the milled face 60; but between the back or inner face 64 of these cartridges and the milled face 62 of the table, there are arranged tapered wedge members 66. The back or inner faces 64 of the cartridges 20 at the left side of the table as illustrated in FIG. 1 or at the top side of FIG. 2 are machined with a taper to correspond with the tapered face 68 of the wedges 66. It will be apparent, therefore, that as the two wedges 66 are moved inwardly toward each other, the associated cartridges 20 will be forced outwardly to thereby preload the balls 22 in both sets of cartridges. The means for moving the wedges 66 inwardly toward each other comprise adjusting screws 70 threaded in depending brackets 72 at opposite ends of table 18. Lock nuts 74 are provided for locking the screws 79 in the desired position of adjustment.

The vertically extending bores 76 in the cartridges 20 backed by the tapered wedges 66 are elongated in a direction transversely of the ways 14 to permit a slight adjustment of these cartridges to effect a preloading of the bearing balls 22.

With the above described arrangement, it will be appreciated that a high degree of preloading in two directions, that is, in the horizontal direction transversely of the ways and in the vertical direction as viewed in FIG. 1, can be obtained by simply advancing screws 70 at the opposite ends of the table. As the screws 70 are advanced toward each other, the two cartridges 20 at the left side of the table as viewed in FIG. 1 are forced outwardly against the associated way 14. The inclination of the tapered faces 64, 68 maintains the balls in grooves 28, 29 in parallelism with the faces 50, 52 of the ways so that the unit pressures on all the balls are substantially uniform. Thus, by establishing the distance between the opposed cartridges on the two sides of table 18 by the adjustment of wedges 66, any desired amount of preloading may be obtained. It will be observed that in this manner, extreme ease of motion of the table along the ways 14 can be obtained while the optimum stiffness in a horizontal direction transversely of the ways as well as a vertical direction is simultaneously obtained. The net result is an extremely high positioning accuracy of the table. This is true even with substantial external loading of the table because the preloading by means of the tapered wedges 66 can be sufficiently high to eliminate the low rate portion of the deflection curve of the bearing units.

In addition to the preloading feature described above, the arrangement disclosed here is also desirable from the standpoint of compactness and relative simplicity. The cartridges 20 are self-contained and designed so that they can be mounted very readily on the table or other movable component of most any machine tool.

It will be understood, of course, that although the invention here is illustrated in connection with a movable table of a machine tool, the invention is not limited to this application. It will likewise be appreciated that in many applications where the movable or translatable component of the machine tool has a length substantially longer than the supporting or fixed component of the machine tool, the ball way cartridges 20 would be mounted on the fixed component and the ways 14 would be mounted on the movable component of the machine tool.

We claim:
1. In a combination, a support member, a translatable member movable on the support member in a rectilinear path and means for guiding the translatable member along said rectilinear path comprising a pair of ways mounted in accurately parallel spaced and opposed relation on one of said members, each of said ways comprising a pair of oppositely inclined faces extending longitudinally of the ways and converging in a direction transversely of the ways, each of said faces having a groove therein, the other member having at least two bearing units mounted thereon each juxtaposed to one of said ways, each of said bearing units comprising a support block having a pair of parallel external grooves thereon, one groove of each block being juxtaposed to a groove on the converging faces of each way, each block also having a pair of internal longitudinally extending passageways connected at opposite ends by passageways one with each of said external grooves, said external grooves and internal passageways being substantially filled with bearing balls, each of the juxtaposed grooves having diametrically opposed arcuate portions of substantial extent which conform in size and shape to the surface of the balls and against which the balls are seated, the bearing balls in said external grooves forming two rows on each support block each in rolling engagement with grooves on the converging faces of each way, said external grooves being angularly related such that the resultant pressure force between each row of balls and the member on which the ways are mounted extends generally perpendicular to the converging face of the way with which the row of balls is associated, one of said blocks having wedge means associated with the member on which the block is mounted for shifting the last mentioned block in a direction towards its associated way in response to movement of the wedge means in a direction parallel to the path of travel of the movable member.

2. The combination called for in claim 1 wherein said external grooves in each block extend along a pair of adjacent longitudinally extending corner portions of each block, each groove being arcuate in cross section and shaped to engage an insufficient portion of each ball to retain the ball in said groove and a pair of ball retaining members mounted on the two faces of the block adjacent the opposite side of each groove, said retaining members overlapping the opposite longitudinal edges of said grooves and extending sufficiently into the grooves to retain the balls in said grooves.

3. The combination called for in claim 1 wherein said ways are formed in said support member and wherein said bearing units are mounted in said translatable member.

4. The combination called for in claim 1 wherein said converging faces comprise opposite V-shaped grooves, said ways being mounted on said support member and the bearing units are mounted on the translatable member between said V-shaped grooves.

5. The combination called for in claim 1 wherein each support block is of generally rectangular shape in transverse section and wherein the two rows of balls on each support block extend along the opposite longitudinal edges of one face of each support block.

6. The combination called for in claim 1 wherein said wedge means comprises a tapered wedge member interposed between the block and the member on which the block is mounted, the wedge member being movable in said last mentioned direction relative to the block and the member on which the block is mounted.

7. A bearing assembly adapted to be mounted on a machine component to effect free relative translation between said component and another machine component having parallel ways thereon, each of which are formed at least in part by a pair of angularly related surfaces comprising a support block having a pair of external parallel spaced ball grooves of arcuate cross sectional contour formed in the outer faces thereof, said support block also having a pair of internal ball passageways extending from one end face of the block to the other end face of the block, end plates secured to each end face of the block, a pair of ball deflector tubes arranged between each end plate and each end face of the block, said deflector tubes connecting the ends of said internal passageways with the adjacent ends of said external grooves, a plurality of bearing balls substantially filling said internal passageways, deflector tubes and external grooves, said bearing balls in said external grooves projecting outwardly of the grooves beyond the adjacent faces of the support block so as to be engageable with said ways when the support block is mounted on said first component, each of said external grooves having a bearing surface of substantial arcuate extent on which the balls are normally seated and which conform in size and shape to the surface of the balls, said bearing surfaces of the two grooves being oppositely inclined to each other such that the resultant pressure force between each row of balls in said external grooves and said ways is inclined to the plane of relative translation between the two components.

8. A bearing assembly as called for in claim 7 wherein said external ball grooves extend circumferentially around an insufficient portion of the balls to retain the balls in the grooves and retainer means on the faces of said support block adjacent the opposite edges of each groove projecting into said grooves from the opposite edge portions thereof to retain the balls in said grooves.

9. The combination called for in claim 5 wherein the internal ball grooves are located adjacent and extend along the longitudinal edges of the opposite face of the block, said connecting passageways at the opposite ends of the block extending diagonally across the block.

References Cited in the file of this patent
UNITED STATES PATENTS

| 2,743,967 | Lappe | May 1, 1956 |

FOREIGN PATENTS

| 1,045,283 | France | June 24, 1953 |
| 1,073,668 | France | Mar. 24, 1954 |
| 761,699 | Great Britain | Nov. 21, 1956 |
| 1,155,134 | France | Nov. 25, 1957 |